US008930509B2

(12) United States Patent
Cannon et al.

(10) Patent No.: US 8,930,509 B2
(45) Date of Patent: *Jan. 6, 2015

(54) REAL-TIME FEEDBACK FOR POLICIES FOR COMPUTING SYSTEM MANAGEMENT

(75) Inventors: David M. Cannon, Tucson, AZ (US); Marshall L. Humphries, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/542,564

(22) Filed: Jul. 5, 2012

(65) Prior Publication Data

US 2012/0278469 A1    Nov. 1, 2012

Related U.S. Application Data

(60) Continuation of application No. 12/760,494, filed on Apr. 14, 2010, which is a division of application No. 10/741,372, filed on Dec. 19, 2003, now Pat. No. 7,734,750.

(51) Int. Cl.
*G06F 15/16* (2006.01)
*G06F 15/173* (2006.01)
*H04L 12/24* (2006.01)

(52) U.S. Cl.
CPC ............ *H04L 41/0893* (2013.01); *H04L 41/08* (2013.01); *H04L 41/22* (2013.01); *H04L 41/0886* (2013.01)
USPC .......................................... 709/220; 709/223

(58) Field of Classification Search
CPC . H04L 41/08; H04L 41/0823; H04L 41/0886; H04L 41/0893

USPC ......... 709/220, 223, 224; 714/25, 37; 703/24; 715/735

See application file for complete search history.

(56) References Cited

U.S. PATENT DOCUMENTS

| 4,849,879 A | 7/1989 | Chinnaswamy et al. |
| 5,065,347 A | 11/1991 | Pajak et al. |
| 5,557,747 A | 9/1996 | Rogers et al. |

(Continued)

FOREIGN PATENT DOCUMENTS

GB    2371646    7/2002

OTHER PUBLICATIONS

Office Action dated Jun. 1, 2007, pp. 1-34, for U.S. Appl. No. 10/741,372, filed Dec. 19, 2003 by Inventors David M. Cannon et al.

(Continued)

*Primary Examiner* — Aaron Strange
(74) *Attorney, Agent, or Firm* — David W. Victor; Konrad, Raynes, Davda and Victor LLP

(57) ABSTRACT

One aspect of the invention is a method for providing real-time feedback regarding the effect of applying a policy definition used for management in a computing system. An example of the method includes receiving the policy definition, and accessing stored information regarding at least one managed entity in the computing system. This example also includes applying the policy definition to the information regarding the at least one managed entity. This example further includes outputting information providing real-time feedback regarding the effect of applying the policy definition to the information regarding the at least one managed entity. Another aspect of the invention is a method for defining a policy used for management in a computing system.

19 Claims, 4 Drawing Sheets

(56) References Cited

U.S. PATENT DOCUMENTS

| | | |
|---|---|---|
| 5,696,486 A | 12/1997 | Poliquin et al. |
| 5,797,128 A | 8/1998 | Birnbaum |
| 5,889,953 A | 3/1999 | Thebaut et al. |
| 5,917,489 A | 6/1999 | Thurlow et al. |
| 6,167,445 A | 12/2000 | Gai et al. |
| 6,327,618 B1 | 12/2001 | Ahlstrom et al. |
| 6,393,473 B1 | 5/2002 | Chu |
| 6,396,473 B1 | 5/2002 | Callahan et al. |
| 6,418,468 B1 | 7/2002 | Ahlstrom et al. |
| 6,430,609 B1 | 8/2002 | Dewhurst et al. |
| 6,473,748 B1 | 10/2002 | Archer |
| 6,484,261 B1 | 11/2002 | Wiegel |
| 6,567,818 B1 | 5/2003 | Frey et al. |
| 6,690,274 B1 | 2/2004 | Bristol |
| 6,879,939 B1 | 4/2005 | Lang et al. |
| 6,941,518 B2 | 9/2005 | French et al. |
| 6,983,351 B2 | 1/2006 | Gibble et al. |
| 7,062,516 B2 | 6/2006 | Bhat |
| 7,257,603 B2 | 8/2007 | Murman et al. |
| 7,392,482 B2 | 6/2008 | Firebaugh et al. |
| 7,734,750 B2 | 6/2010 | Cannon et al. |
| 2002/0169829 A1 | 11/2002 | Shuster |
| 2002/0174182 A1 | 11/2002 | Wilkinson et al. |
| 2002/0174306 A1 | 11/2002 | Gajjar et al. |
| 2002/0178249 A1 | 11/2002 | Prabakaran et al. |
| 2002/0178271 A1 | 11/2002 | Graham et al. |
| 2002/0198996 A1 | 12/2002 | Sreenivasan et al. |
| 2003/0037040 A1 | 2/2003 | Beadles et al. |
| 2003/0046396 A1 | 3/2003 | Richter et al. |
| 2003/0115204 A1 | 6/2003 | Greenblatt et al. |
| 2004/0078591 A1 | 4/2004 | Teixeira et al. |
| 2004/0088382 A1 | 5/2004 | Therrien et al. |
| 2004/0153471 A1 | 8/2004 | Saika et al. |
| 2004/0162879 A1 | 8/2004 | Arcuri et al. |
| 2005/0010819 A1 | 1/2005 | Williams et al. |
| 2007/0016750 A1 | 1/2007 | Suzuki |
| 2010/0198958 A1 | 8/2010 | Cannon et al. |

OTHER PUBLICATIONS

Response to Office Action dated Dec. 3, 2007, pp. 1-28, for U.S. Appl. No. 10/741,372, filed Dec. 19, 2003 by Inventors David M. Cannon et al.

Office Action dated Mar. 14, 2008, pp. 1-35, for U.S. Appl. No. 10/741,372, filed Dec. 19, 2003 by Inventors David M. Cannon et al.

Response to Office Action dated Sep. 16, 2008, pp. 1-21, for U.S. Appl. No. 10/741,372, filed Dec. 19, 2003 by Inventors David M. Cannon et al.

Requirement for Restriction/Election dated Dec. 9, 2008, pp. 1-6, for U.S. Appl. No. 10/741,372, filed Dec. 19, 2003 by Inventors David M. Cannon et al.

Response to Restriction Requirement and Amendment dated Jan. 9, 2009, pp. 1-9, for U.S. Appl. No. 10/741,372, filed Dec. 19, 2003 by Inventors David M. Cannon et al.

Office Action dated Mar. 19, 2009, pp. 1-12, for U.S. Appl. No. 10/741,372, filed Dec. 19, 2003 by Inventors David M. Cannon et al.

Response to Office Action dated Jul. 21, 2009, pp. 1-14, for U.S. Appl. No. 10/741,372, filed Dec. 19, 2003 by Inventors David M. Cannon et al.

Final Office Action dated Nov. 13, 2009, pp. 1-8, for U.S. Appl. No. 10/741,372, filed Dec. 19, 2003 by Inventors David M. Cannon et al.

Response to Final Office Action dated Jan. 13, 2010, pp. 1-10, for U.S. Appl. No. 10/741,372, filed Dec. 19, 2003 by Inventors David M. Cannon et al.

Notice of Allowance dated Jan. 29, 2010, pp. 1-6, for U.S. Appl. No. 10/741,372, filed Dec. 19, 2003 by Inventors David M. Cannon et al.

Office Action dated Feb. 2, 2012, pp. 1-14, for U.S. Appl. No. 12/760,494, filed Apr. 14, 2010 by inventors David M. Cannon et al.

Response to Office Action dated May 2, 2012, for U.S. Appl. No. 12/760,494, filed Apr. 14, 2010 by inventors David M. Cannon et al.

Notice of Allowance dated May 21, 2012, pp. 1-7, for U.S. Appl. No. 12/760,494, filed Apr. 14, 2010 by inventors David M. Cannon et al.

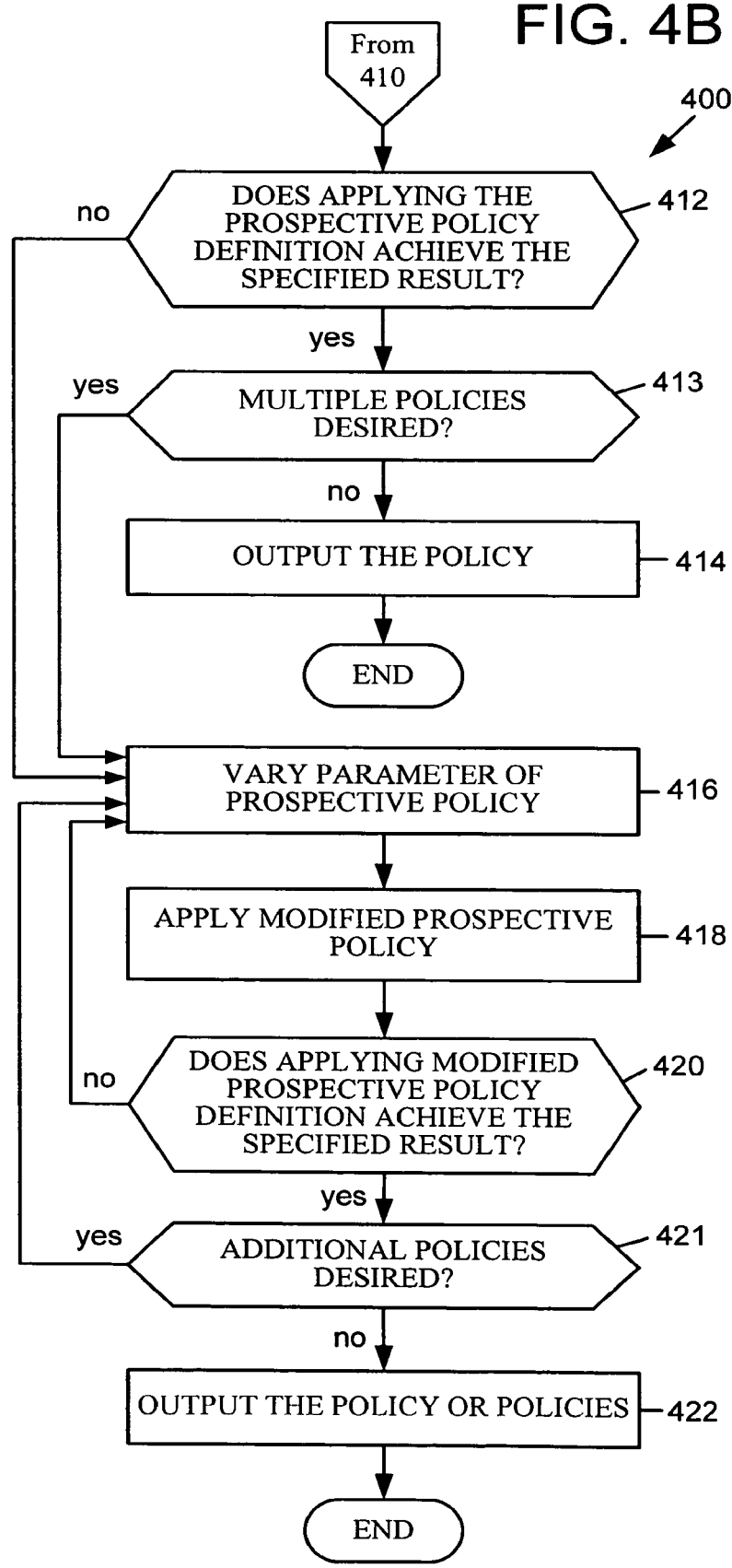

REAL-TIME FEEDBACK FOR POLICIES FOR COMPUTING SYSTEM MANAGEMENT

RELATED APPLICATION

This application is a continuation of U.S. patent application Ser. No. 12/760,494, filed Apr. 14, 2010, which is a divisional of U.S. Pat. No. 7,734,750, issued Jun. 8, 2010, which patent application and patent are incorporated herein by reference in their entirety.

BACKGROUND

1. Technical Field

The present invention relates to management and control of resources in a computing system. More particularly, the invention concerns defining a policy, or providing real-time feedback regarding the effect of applying a policy used for management in a computing system.

2. Description of Related Art

Modern computing systems frequently include a large number of computing devices, storage devices, and other components. Management programs may be used to manage these computing environments. Some management products offer policy-based schemes for managing different entities in computing systems, such as security settings for a large user base, or storage resources throughout an enterprise. The policies may be, for example, simple rules, or complex, hierarchical, inheritance policies.

Storage resource manager (SRM) software is often used to manage entities in computing systems. For example, IBM Tivoli Storage Resource Manager (ITSRM) may be used to manage storage resources. SRM software facilitates management of storage resources throughout an enterprise by centrally monitoring storage assets and their utilization, by reporting events, and by allocating storage based on pre-defined policies. As an example, a SRM may provide automatic, policy-based provisioning of storage resources for host computer systems in an enterprise in order to satisfy criteria for each machine such as free space or capacity.

Although policy-based products are widely used, they are often difficult to use to their full advantage because they do not provide a "preview" to show an administrator the effect that potential new or changed policies will have upon the entities managed by those policies. Because of this limitation, it is difficult for a policy administrator to conduct various "what-if" scenarios that may be necessary for implementing a successful policy. Due to the absence of real-time feedback, administrators are forced to either attempt to manually run through all of the possible scenarios, or to follow a "try-it-and-see" method where they implement a "best guess" policy and test it out to see what it actually does. Such approaches to managing policies are often labor intensive, error-prone, and unpredictable.

SUMMARY

One aspect of the invention is a method for providing real-time feedback regarding the effect of applying a policy definition used for management in a computing system. An example of the method includes receiving the policy definition, and accessing stored information regarding at least one managed entity in the computing system. This example also includes applying the policy definition to the information regarding the at least one managed entity. This example further includes outputting information providing real-time feedback regarding the effect of applying the policy definition to the information regarding the at least one managed entity. Another aspect of the invention is a method for defining a policy used for management in a computing system.

Other aspects of the invention are described in the sections below, and include, for example, a computing system, and a signal bearing medium tangibly embodying a program of machine-readable instructions executable by a digital processing apparatus to perform a method for providing real-time feedback regarding the effect of applying a policy definition used for management in a computing system, or to perform a method for defining a policy used for management in a computing system.

Some examples of the invention provide one or more of the following advantages: Real-time feedback is provided concerning the effect of a new or changed policy. The effects of policy changes are predicted before changes are implemented. Manual effort required to assess effects of policies is significantly reduced, and the possibility of human error is also reduced. Other examples of the invention have the ability to define policies to achieve specified overall results. Some examples of the invention also provide a number of other advantages and benefits, which should be apparent from the following description.

BRIEF DESCRIPTION OF THE DRAWINGS

FIGS. 4A-B are a flowchart of an operational sequence for defining a policy used for management in a computing system, in accordance with an example of the invention.

DETAILED DESCRIPTION

Figure 1:
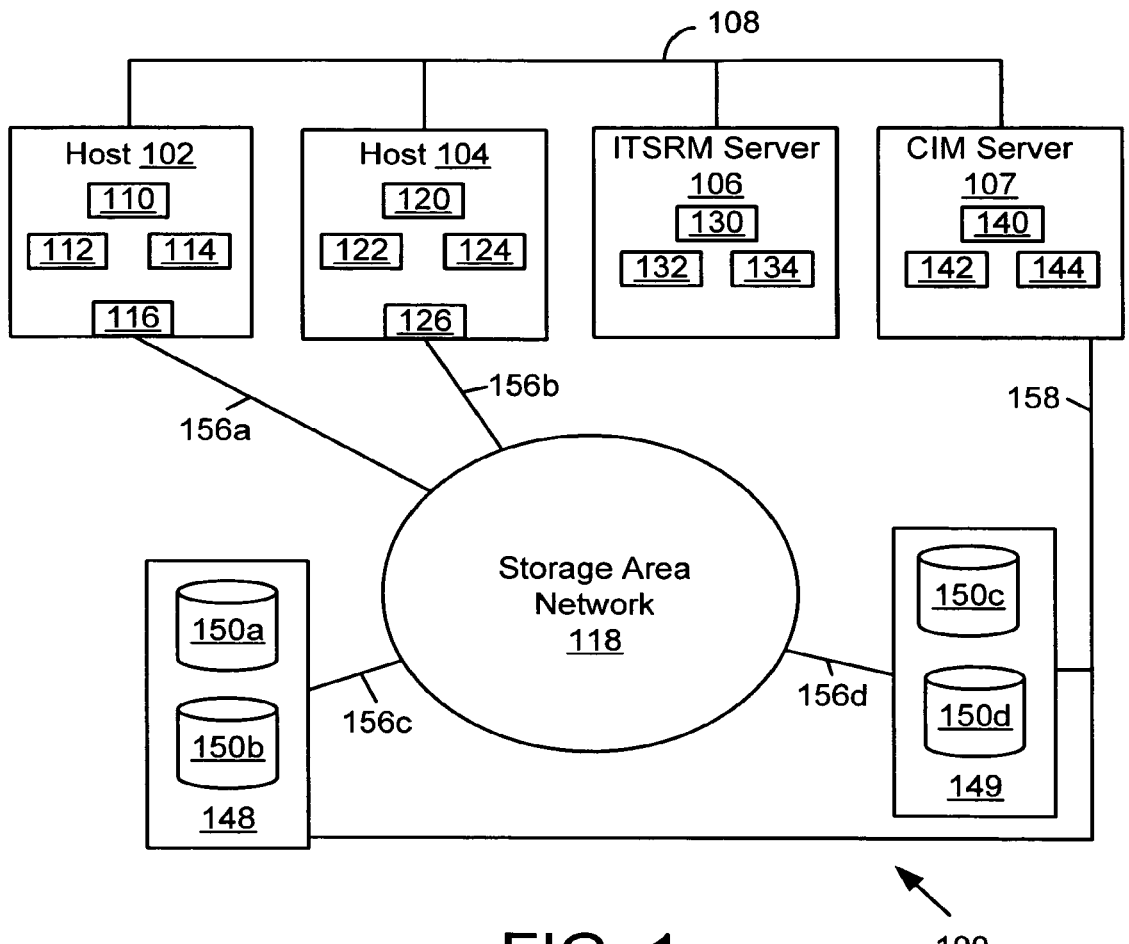
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that can be used for providing real-time feedback regarding the effect of applying a policy definition used for management in a computing system, and for defining a policy used for management in a computing system. As an example, the computing system may be embodied by all, or portions of, the computing system 100 shown in FIG. 1. However, examples of the invention could be implemented on computing systems having different components than the computing system 100. The computing system 100 includes a first host 102 and a second host 104. Alternatively, only one host could be included, or additional hosts could be included, and client computers could be included. The computing system 100 also includes an ITSRM server 106, and a CIM Server 107 (which may also be called a CIM Object Manager (CIMOM)). A CIM Server is a server that runs a common interface for managing a storage system. Each host 102, 104, ITSRM server 106, and the CIM server 107 may run the same or different operating systems, which could be any suitable operating system(s), for example, Windows 2000, AIX, Solaris™, Linux, UNIX, or HP-UX™. Each host 102, 104, ITSRM server 106, and the CIM server 107 may be implemented with any suitable computing device, and may be implemented with the same, or different computing devices. As an example, host 102, host 104, ITSRM server 106, and the CIM server 107 could be a personal computer (having for example, an Intel processor running the Windows or Linux operating system), a computer workstation, a mainframe computer, a supercomputer (for example an IBM SP2 running the AIX operating system), or any other suitable computing device running any suitable operating system. In other examples, the host 102, host 104, ITSRM server 106, and the CIM server 107 could be an IBM xSeries server, or an IBM zSeries Parallel Sysplex server, such as a zSeries 900, running the z Operating System (z/OS), or an IBM S/390 server running OS/390. Some examples of the invention may be incorporated into IBM Tivoli Storage Resource Manager (ITSRM) 1.2, and may supplement the "Automatic policy-based filesystem extension" feature. The hosts 102, 104, ITSRM server 106, and the CIM server 107 may be coupled to each other with a network 108, which may be an IP network, and which could be any suitable type of network, for example, Ethernet, ESCON (Enterprise Systems CONnnector), or FICON (FIber CONnector). Additionally, network 108 could use the Internet, and could utilize wireless technology. The hosts 102, 104 need not be coupled to the CIM server 107 via the network 108.

The host 102 has a processor 110 (which may be called a processing device), and in some examples could have more than one processor. As an example, the processor 110, may be a PowerPC RISC processor or an IBM P690 power 4 processor, available from International Business Machines Corporation. In another example, the processor 110 could be a processor manufactured by Intel Corporation. The host 102 also may have a memory subsystem that may include a primary memory 112 (for example RAM), and/or a non-volatile memory 114, both of which are coupled to the processor 110. The memory subsystem may be used to store data and application programs and/or other programming instructions executed by the processor 110. The application programs could generally be any suitable applications. In some examples, embodiments of the method aspects of the invention could run on the host 102. The non-volatile memory 114 could be, for example, a hard disk drive, a drive for reading and writing from optical or magneto-optical media, a tape drive, non-volatile RAM (NVRAM), or any other suitable type of storage. In some examples the primary memory 112 or the non-volatile memory 114 could be eliminated, or the primary memory 112 and/or the non-volatile memory 114 could be provided on the processor 110, or alternatively, external from the host 102. The host 102 also has a hardware bus adapter (HBA) 116, coupled to the processor 110, for coupling the host 102 via connector 156*a* to a Fibre Channel network (which may be called a "fabric" that may be used to implement a SAN 118. As an example, connector 156*a* may support FICON (Fiber CONnector), ESCON (Enterprise Systems CONnnector) communications channels. As an example, the hardware bus adapter 116 could be a model 2200 hardware bus adapter available from QLogic Corporation. Generally, the SAN 118 may be implemented using Fibre Channel network(s) and/or Ethernet network(s). In other embodiments a SAN need not be included. Using the SAN 118 permits coupling a large number of storage devices to the hosts 102, 104.

Similar to host 102, host 104 has a processor 120, a memory subsystem that that may include a primary memory 122 (for example RAM), and/or a non-volatile memory 124, both of which are coupled to the processor 120. The memory subsystem may be used to store data and application programs and/or other programming instructions executed by the processor 120. The application programs could generally be any suitable applications. In some examples, embodiments of the method aspects of the invention could run on the host 104. The host 104 also has a hardware bus adapter 126, for coupling the host 104 to the SAN 118 via connector 156*b*.

Similar to hosts 102 and 104, ITSRM server 106 has a processor 130, a memory subsystem that may include a primary memory 132 (for example RAM), and/or a non-volatile memory 134, both of which are coupled to the processor 130. The memory subsystem may be used to store data and application programs and/or other programming instructions executed by the processor 130. The application programs could generally be ITSRM and any other suitable applications. In some examples, embodiments of the method aspects of the invention could run on the ITSRM server 106. In some examples the ITSRM server 106 could have a hardware bus adapter (not shown) and could be coupled to the SAN 118. In some embodiments, the ITSRM server 106 is not included in the computing system 100.

Similar to hosts 102 and 104, and ITSRM server 106, CIM server 107 has a processor 140, a memory subsystem that may include a primary memory 142 (for example RAM), and/or a non-volatile memory 144, both of which are coupled to the processor 140. The memory subsystem may be used to store data and application programs and/or other programming instructions executed by the processor 140. The application programs could generally be a CIM Object Manager program, and any other suitable applications. In some examples, embodiments of the method aspects of the invention could run on the CIM server 107. In some examples, the CIM server 107 could have a hardware bus adapter (not shown) and could be coupled to the SAN 118. In alternative embodiments, the CIM Server 107 could be embedded in other devices, such as, for example, a storage system 148 or storage system 149 discussed below. In some embodiments, the CIM server 107 is not included in the computing system 100. Also, in some embodiments, the CIM server 107 could be embedded in a storage system.

The computing system 100 also may include storage system 148 and storage system 149. Storage devices 150*a-b* are included in storage system 148, and storage devices 150*c-d* are included in storage system 149. The storage systems 148, 149 could include additional storage devices. Generally, a large number of storage systems may be coupled to the SAN 118. Storage devices that are not in storage systems could be coupled directly to the SAN 118, or could be coupled to the SAN 118 through a switch (not shown). The storage devices 150*a-d* are coupled to hosts 102, 104 through the SAN 118, via connectors 156*a-d*. As an example, connectors 156*a-d* could support FICON (FIber CONnector) or ESCON (Enterprise Systems CONnnector) communications channels. However, other types of connections could be used. Each storage system 148, 149 has a storage controller (not shown) and is coupled to the SAN 118 through a network adapter (not shown). There may be multiple paths to the storage systems 148, 149 in the SAN 118. In alternative embodiments, computing environments that include storage systems but that do not include a SAN could be used. The CIM server 107 is coupled to the storage systems 148, 149 via the network 158, which may be an IP network, and which could be any suitable type of network, for example, Ethernet, ESCON (Enterprise Systems CONnnector), or FICON (FIber CONnector). Additionally, network 158 could use the Internet, and could utilize wireless technology.

The plurality of storage devices 150*a-d* may include, for example, hard drives. However, each of the storage devices in the plurality of storage devices could be implemented with any suitable type of storage device, using any suitable technology, such as magnetic, optical, magneto-optical, or electrical. For example, suitable storage devices could include hard disk drives, optical disks or discs (for example, CD-RW, DVD-RW, or DVD+RW), floppy disks, magnetic data storage disks or diskettes, magnetic tape, digital optical tape, a tape library, EPROMs, EEPROMs, RAM, Non-Volatile RAM, and flash memory. Additionally, CD-R, WORM, DVD-R, and/or DVD+R devices could be included in the plurality storage devices. As an example, one or more of the storage systems 148, 149 could be implemented with a Model F20 or Model 800 Enterprise Storage Server, available from IBM Corporation. As another example, disk storage could be implemented with an IBM FAStT 900, and a tape library could be implemented with an IBM 3494 tape library using IBM 3590 drives, all of which are available from IBM Corporation.

II. Operation

In addition to the hardware embodiments described above, other aspects of the invention concern methods for providing real-time feedback regarding the effect of applying a policy definition used for management in a computing system, and for defining a policy used for management in a computing system.

A. Signal-Bearing Media

In the context of FIG. 1, the method aspects of the invention may be implemented, for example, by having the host 102, the host 104, the ITSRM Server 106, and/or the CIM server 107 execute a sequence of machine-readable instructions, which can also be referred to as code. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform a method for providing real-time feedback regarding the effect of applying a policy definition used for management in a computing system, or to perform a method for defining a policy used for management in a computing system.

Figure 2:
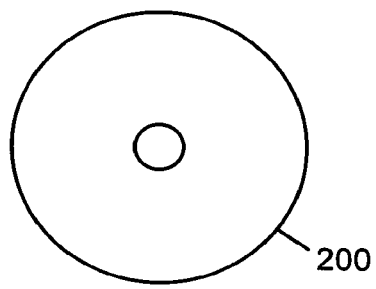
FIG. 2 is an example of a signal-bearing medium in accordance with an example of the invention.

This signal-bearing medium may comprise, for example, primary memory 112 and/or non-volatile memory 114, primary memory 122 and/or non-volatile memory 124, primary memory 132 and/or non-volatile memory 134, and/or primary memory 142 and/or non-volatile memory 144. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", or may comprise Java bytecode.

B. Overall Sequence of Operation

For ease of explanation, but without any intended limitation, the method aspects of the invention are described with reference to the computing system 100 described above and shown in FIG. 1.

First Example of Method Aspect of the Invention

Figure 3:
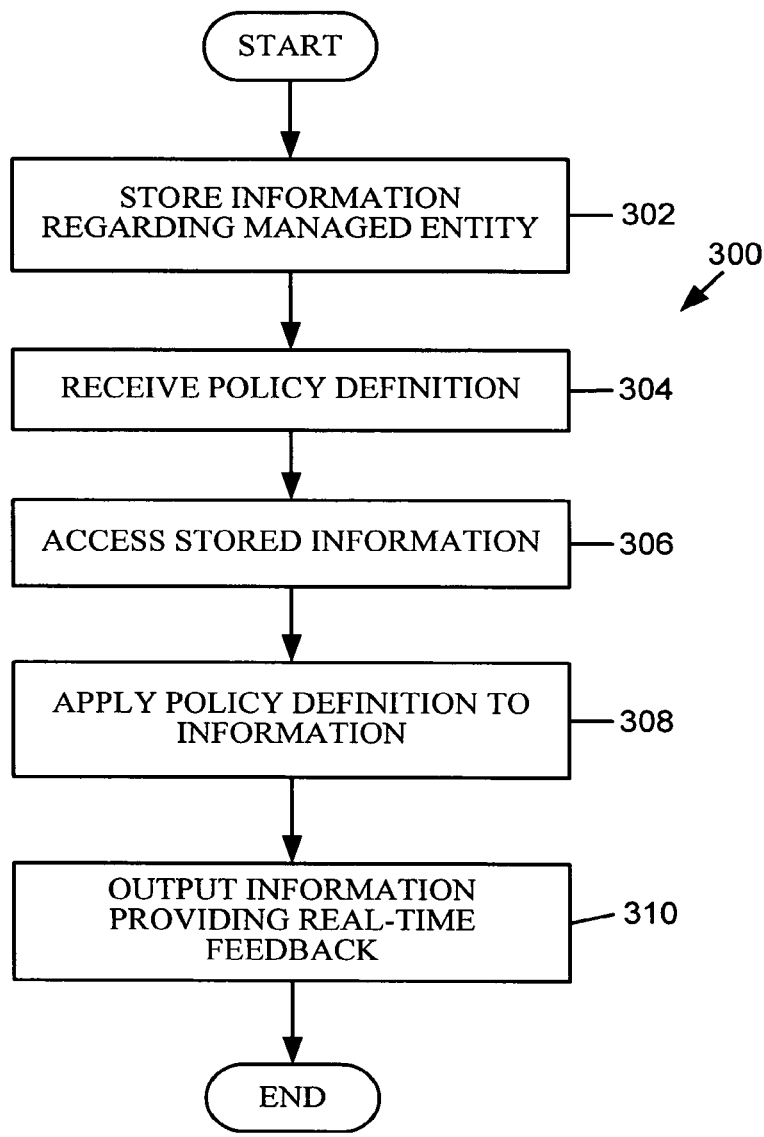
FIG. 3 is a flowchart of an operational sequence for providing real-time feedback regarding the effect of applying a policy definition used for management in a computing system, in accordance with an example of the invention.

A first example of the method aspect of the present invention is illustrated in FIG. 3, which shows a sequence 300 for a method for providing real-time feedback regarding the effect of applying a policy definition used for management in a computing system. The sequence 300 could be performed by host 102, host 104, ITSRM server 106, CIM server 107, or by some other computing device. Referring to FIG. 3, the sequence 300 may include, and begin with, operation 302 which comprises storing historical information regarding the at least one managed entity in an information repository. As an example, the information may be gathered by an agent on a host 102, 104, and may be sent to the ITSRM server 106 for storage. As an example, the information may include attributes regarding managed entities, such as the amount of space in a filesystem, and how much space is in use in the filesystem. As an example, the information repository could be a data base, which could be maintained by the ITSRM server 106. However, the data base could be located elsewhere in the computing system 100. As an example, the at least one managed entity may include a storage device entity. As another example, the at least one managed entity may include a memory entity. As another example, the at least one managed entity may include a CPU (Central Processing Unit) entity. Herein CPU means a processor having a control unit and an arithmetic logic unit.

Sequence 300 may also include operation 304, which comprises receiving a policy definition. A policy may also be called a rule. A policy definition may include a list of one or more managed entities to which the policy definition is to be applied (which may be called the "binding"). The policy definition may be a new policy definition, a modification of a previous policy definition, or may include information indicating that a policy definition is to be applied to a different entity to which it was not previously applied. The policy definition may be stored on the ITSRM server 106, or elsewhere in the computing system 100. As an example, the policy definition may pertain to storage resource management in the computing system 100. As another example, the policy definition may pertain to automatic policy-based filesystem extension in the computing system 100. As another example, the policy definition may pertain to security in the computing system 100. In a specific example relating to tape storage systems, the policy definition could specify that a reclaim operation should be performed for a tape storage system if unused space exceeds 60%. An administrator could change the policy definition to specify that the reclaim operation should be performed if unused space exceeds 40%, and could use some examples of the invention to compare the effects of this policy definition with the effects of the policy definition with the 60% threshold. An example of a policy definition, relating to hard drive replacement, could state that a hard drive should be replaced if the number of detected errors is greater than a specified number. An example of a policy definition relating to email management, could state that if a user is using more than 100 Mbytes of storage for email, then the user will be required to delete some email files or will be charged a surcharge. Policies relating to email management could also be based on the daily volume of email, or the age of email files.

Sequence 300 may also include operation 306, which comprises accessing stored information regarding at least one managed entity in the computing system. The information that is accessed in operation 306 is some or all of the information stored in operation 302. Sequence 300 may also include operation 308, which comprises applying the policy definition to the information regarding the at least one managed entity. The policy definition will generally be applied to data regarding attributes of managed entities that is included in the stored information. Examples of attributes for filesystem entities include the amount of free space, and how much space in the filesystem is in use. If desired, the effect of the policy definition may be evaluated with regard to all of the managed entities. The policy definition or a similar policy definition may have previously been applied to the at least one managed entity. In some examples the applying operation may comprise applying the policy definition to a managed entity to which the policy definition or a similar policy definition has not previously been applied.

Sequence 300 may also include operation 310, which comprises outputting information providing real-time feedback regarding the effect of applying the policy definition to the information regarding the at least one managed entity. The "effect" may include plural effects if there is more than one effect. As an example, if an entity with known attributes is assigned to be managed by a different policy, the effects of the policy change can be previewed or immediately evaluated once the change is made. In some examples the policy definition has not been implemented (also called committed), when the information providing real-time feedback is outputted, and this may be called a preview mode. Alternatively, in some examples the information providing real-time feedback is outputted substantially immediately after implementation of the policy. As an example, the information providing real-time feedback may be outputted within 10 seconds from when the policy definition is received. In other examples the information providing real-time feedback could be outputted within one minute, within 30 seconds, within 5 seconds, or within 1 second, from when the policy definition is received.

The operation of outputting information providing real-time feedback may comprise outputting the information from a software module or from a computing system, or may further comprise displaying information on a GUI (Graphical User Interface) indicating which managed entities in a plurality of managed entities would be affected if the policy definition were to be implemented. More specifically, the operation of outputting information providing real-time feedback may comprise displaying information on a GUI indicating host machines and filesystems that would be affected if the policy definition were to be implemented. For example, a file tree could be displayed, wherein filesystems that will be immediately affected by a policy definition are highlighted. This feedback can help an administrator determine which filesystems a policy should be tailored to apply to. After receiving feedback for a policy definition, operations 304, 306, 308, and 310 could be repeated with another policy definition supplied by the administrator, and the administrator could compare the effects of the different policies.

Thus, some embodiments of the invention provide real-time feedback to policy administrators, permitting policy administrators to see what the effects of policy decisions will be before implementing a policy. The real-time feedback can be used to help an administrator determine what policies to set, and to permit the administrator to anticipate the effects of those policies (for example, which managed entities will be affected, and to what degree the entities will be affected). While this method of real-time feedback is applicable to many fields, some exemplary applications include system management and storage resource management, and a specific application is automated filesystem extension. In the automated filesystem extension application, an administrator can create policies to determine when a filesystem should be extended. For example, a policy could be created that provides, "when the filesystems on monitored host machines reach 80% of their maximum capacity, extend those filesystems so that they have 50% free space." While this policy is relatively easy to understand and seems useful, it may be a dangerous policy to implement. For example, it is possible that this policy will affect filesystems that the administrator had not intended to modify (such as root filesystems) because it is so broad in scope. It is also possible that several of the monitored filesystems are already at 80% of their maximum capacity. In this latter case, implementing the policy immediately might result in several filesystems being extended at once and there might not be sufficient available storage in a computing network to accommodate the sudden growth. To help the administrator better understand the consequences of policy choices, some examples of the invention can be used to simulate use of a policy and to notify the administrator as to exactly which managed entities will be affected by policy changes. Specifically, when a policy definition is modified in any way (for example, a new filesystem is associated with a policy), the backend of a system implementing an example of the invention could immediately compare that policy against the information it has already collected about the entity to which that policy will be applied (in this case, the new filesystem), to determine the effect of the change (for example, will this filesystem need to be extended). This method allows the GUI to immediately show the administrator which host machines and filesystems would be affected by proposed policy settings without the administrator having to actually implement that policy and without waiting for any sort of discovery action (for example, without having to wait several hours to see what happens after the policy is implemented).

Second Example of Method Aspect of the Invention

Figure 4A:
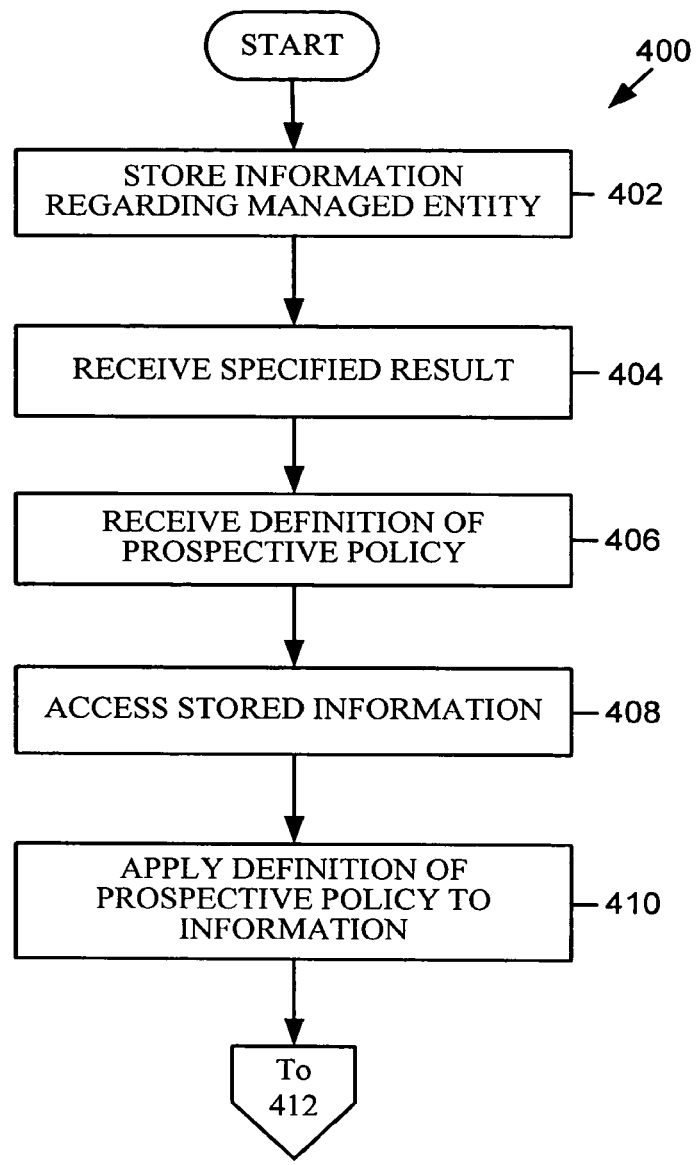

A second example of the method aspect of the present invention is illustrated in FIGS. 4A-B, which show a sequence 400 for a method for defining a policy used for management in a computing system. The sequence 400 could be performed by host 102, host 104, ITSRM server 106, CIM server 107, or by some other computing device. Referring to FIG. 4A, the sequence 400 may include, and begin with, operation 402 which comprises storing information in an information repository regarding the at least one managed entity. As an example, the information repository could be a data base, and could be in the ITSRM server 106. As an example, the information may indicate the amount of space in a filesystem, and how much space in the filesystem is in use. As an example, the at least one managed entity may include a storage device entity (and in this case, as an example, policies could relate to requesting a filesystem extension). As another example, the at least one managed entity could include a memory entity (and in this case, policies could relate to memory allocation). As another example, the at least one managed entity could include a CPU entity (and in this case, policies could relate to allocation of CPU cycles to various tasks so as to optimize desired performance characteristics).

Sequence 400 may also include operation 404, which comprises receiving a specified result. For example, an administrator could specify the result that a system allocate available storage space to filesystems in an enterprise so as to maximize min_pct_free_space (the smallest percentage of free-space of any filesystem in the enterprise). An example of the invention could then be used to determine a policy for maximizing min_pct_free_space.

Sequence 400 may also include operation 406, which comprises receiving a definition of a prospective policy and a list of policy parameters (also called criteria) that may be adjusted. The list may include one or more parameters, and may also include information prioritizing the parameters in a particular order, and may also include information indicating a range for each parameter. For example, the prioritizing information may indicate that a first parameter may be varied within a first range to attempt to produce the specified result, and that a second parameter may be varied within a second range to attempt to produce the specified result. The second parameter may be varied to attempt to produce the specified result if the specified result cannot be produced by varying the first parameter within the first range, or if more than one successful policy is desired. Also, more than two parameters may be prioritized, and varied to attempt to achieve the specified result. As an example, the policy may pertain to automatic policy-based filesystem extension in a computing system. Policy parameters may include, for example, the threshold percentage of filesystem usage that will trigger a request for a filesystem extension. In a hard drive replacement application, policy parameters may include the number of errors that will trigger a recommendation of replacement of a hard drive. Sequence 400 may also include operation 408, which comprises accessing stored information regarding at least one managed entity in the computing system. Sequence 400 may also include operation 410, which comprises applying the definition of the prospective policy to the information regarding the at least one managed entity.

Referring to FIG. 4B, sequence 400 may also include operation 412, which comprises determining if the result of applying the definition of the prospective policy to the information regarding the at least one managed entity achieves the specified result. Sequence 400 may also include operation 413, which comprises determining if multiple policies that achieve the specified result (successful policies) are desired. If it is determined in operation 412 that the result of applying the definition of the prospective policy to the information regarding the at least one managed entity achieves the specified result, and if it is determined in operation 413 that multiple policies are not desired, then sequence 400 may include operation 414, which comprises outputting the policy (also called the policy definition). In some examples outputting operation 414 may be performed even if it is determined in operation 413 that multiple policies are desired. As an example, outputting the policy could include outputting the policy from a software module or from a computing system, and could also include displaying the policy on a GUI. The operation 414 of outputting the policy may also include outputting information indicating what action will be taken if the outputted policy is implemented.

If in operation 412 it is determined that the result of applying the definition of the prospective policy to the information regarding the at least one managed entity does not achieve the specified result, or if it is determined in operation 413 that multiple policies are desired, then the sequence 400 may include one or more of the operations 416, 418, 420, 421, and 422. Operation 416 comprises varying a parameter of the prospective policy to create a modified prospective policy definition (also called a modified prospective policy). Operation 418 comprises applying the modified prospective policy definition to the information regarding the at least one managed entity. Operation 420 comprises determining if the result of applying the modified prospective policy definition to the information regarding the at least one managed entity achieves the specified result. If in operation 420 it is determined that the result of applying the definition of the modified prospective policy to the information regarding the at least one managed entity does not achieve the specified result, then one or more of operations 416, 418, and 420 may be repeated. Sequence 400 may also include operation 421, which comprises determining if additional successful policies are desired. Operation 421 may be performed if in operation 420 it is determined that the result of applying the definition of the modified prospective policy to the information regarding the at least one managed entity achieves the specified result. If in operation 421 it is determined that additional successful policies are desired, operations 416, 418 and 420 may be repeated. If it is determined in operation 421 that additional successful policies are not desired, then outputting operation 422 may be performed. Consequently, a policy and/or one or more modified policies may be identified that achieve the specified result, and the successful policy and/or the one or more successful modified policies may be outputted in operation 422. In this case the administrator may choose which outputted policy definition or modified policy definition to implement.

Thus, with the second example of the method aspect of the invention, an administrator describes a desired overall result, and employs an example of the invention to define a policy that achieves the desired result.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for defining at least one policy used for management in a computing system, comprising:
    receiving, by the computing system, a specified result to be produced by at least one managed entity;
    receiving, by the computing system, a prospective policy and a list of parameters of the prospective policy that may be adjusted;
    accessing, by the computing system, stored information in a repository regarding at least one managed entity in the computing system, wherein the information indicates resource usage by the managed entity;
    applying, by the computing system, the prospective policy to the information regarding the at least one managed entity;
    determining, by the computing system, if applying the prospective policy to the information regarding the at least one managed entity produces the specified result;

outputting, by the computing system, the prospective policy in response to determining that the applying the prospective policy produces the specified result;

in response to determining that the applying the prospective policy does not produce the specified result, performing, by the computing system:

varying, within a first range, a first parameter in the list of parameters to create a first modified prospective policy;

applying the first modified prospective policy to the information regarding the at least one managed entity; and determining if applying the first modified prospective policy to the information regarding the at least one managed entity produces the specified result, and if so, outputting the first modified prospective policy.

2. The method of claim 1, wherein the list of parameters includes information prioritizing the parameters in a particular order, wherein the list of parameters includes information indicating a range for each parameter, wherein the parameter in the list varied in the first range has a first priority, wherein the operations performed by the computing system further comprise:

varying, within a second range, a second parameter in the list of parameters having a second priority to create a second modified prospective policy;

applying the second modified prospective policy to the information regarding the at least one managed entity;

determining if applying the second modified prospective policy to the information regarding the at least one managed entity produces the specified result;

and if so, outputting the second modified prospective policy.

3. The method of claim 2, wherein the operations performed by the computing system further comprise:

varying, within a third range, a parameter in the list of parameters having a third priority to create a third modified prospective policy;

applying the third modified prospective policy to the information regarding the at least one managed entity;

determining if applying the third modified prospective policy to the information regarding the at least one managed entity produces the specified result;

and if so, outputting the third modified prospective policy.

4. The method of claim 3, wherein, if it is determined that the applying the first modified prospective policy and the second modified prospective policy and the third prospective policy to the information regarding the at least one managed entity do not produce the specified result, then the operations performed by the computing system further comprise:

varying, within a fourth range, a parameter in the list of parameters having a fourth priority to create a fourth modified prospective policy;

applying the fourth modified prospective policy to the information regarding the at least one managed entity;

determining if applying the fourth modified prospective policy to the information regarding the at least one managed entity produces the specified result;

and if so, outputting the fourth modified prospective policy.

5. The method of claim 1, further comprising storing information regarding the at least one managed entity in an information repository.

6. The method of claim 1, wherein the information indicates the amount of space in a filesystem, and how much of the space is in use.

7. The method of claim 1, wherein the policy is for automatic policy-based filesystem extension in a computing system.

8. The method of claim 1, wherein the at least one managed entity includes a storage device entity.

9. The method of claim 1, wherein the at least one managed entity includes a memory entity.

10. The method of claim 1, wherein the at least one managed entity includes a CPU entity.

11. A machine-readable data storage device embodying a program of machine-readable instructions executable by a digital processing apparatus to perform real-time feedback regarding the effect of applying a policy definition used for management in a computing system, wherein the instructions when executed perform operations, the operations comprising:

receiving a specified result to be produced by at least one managed entity;

receiving a prospective policy and a list of parameters of the prospective policy that may be adjusted;

accessing stored information in a repository regarding at least one managed entity in the computing system, wherein the information indicates resource usage by the managed entity;

applying the prospective policy to the information regarding the at least one managed entity;

determining if applying the prospective policy to the information regarding the at least one managed entity produces the specified result;

outputting the prospective policy in response to determining that the applying the prospective policy produces the specified result;

in response to determining that the result of applying the prospective policy does not produce the specified result, performing:

varying, within a first range, a first parameter in the list of parameters to create a first modified prospective policy;

applying the first modified prospective policy to the information regarding the at least one managed entity; and determining if applying the first modified prospective policy to the information regarding the at least one managed entity produces the specified result, and if so, outputting the first modified prospective policy.

12. The machine-readable data storage device of claim 11, wherein the list of parameters includes information prioritizing the parameters in a particular order, wherein the list of parameters includes information indicating a range for each parameter, wherein the parameter in the list varied in the first range has a first priority, wherein the operations further comprise:

varying, within a second range, a second parameter in the list of parameters having a second priority to create a second modified prospective policy;

applying the second modified prospective policy to the information regarding the at least one managed entity;

determining if applying the second modified prospective policy to the information regarding the at least one managed entity produces the specified result;

and if so, outputting the second modified prospective policy.

13. The machine-readable data storage device of claim 12, wherein the operations further comprise:

varying, within a third range, a parameter in the list of parameters having a third priority to create a third modified prospective policy;

applying the third modified prospective policy to the information regarding the at least one managed entity;

determining if applying the third modified prospective policy to the information regarding the at least one managed entity produces the specified result;

and if so, outputting the third modified prospective policy.

14. The machine-readable data storage device of claim 13, wherein, if it is determined that the applying the first modified prospective policy and the second modified prospective policy and the third prospective policy to the information regarding the at least one managed entity do not produce the specified result, then the operations further comprise:

varying, within a fourth range, a parameter in the list of parameters having a fourth priority to create a fourth modified prospective policy;

applying the fourth modified prospective policy to the information regarding the at least one managed entity;

determining if applying the fourth modified prospective policy to the information regarding the at least one managed entity produces the specified result;

and if so, outputting the fourth modified prospective policy.

15. The machine-readable data storage device of claim 11, wherein the operations further comprise:

in response to determining that the applying the prospective policy produces the specified result and that additional policies are desired, then the operations further comprise:

(a) varying, within a first range, a parameter in the list of parameters having a first priority to create a first modified prospective policy;

(b) applying the first modified prospective policy to the information regarding the at least one managed entity; and (c) determining if applying the first modified prospective policy to the information regarding the at least one managed entity produces the specified result; and in response to determining that the applying the first modified prospective policy does not produce the specified result, then the operations further comprise performing operations (a), (b), and (c); and outputting each prospective policy and modified prospective policy that is determined to produce the specified result.

16. A computing system, comprising:

a memory including a program of machine-readable instructions executed to perform real-time feedback regarding the effect of applying a policy definition used for management in the computing system;

a processing device coupled to the memory, wherein the processing device executes the program of machine-readable instructions to perform operations, the operations comprising:

receiving a specified result to be produced by at least one managed entity;

receiving a prospective policy and a list of parameters of the prospective policy that may be adjusted;

accessing stored information in a repository regarding at least one managed entity in the computing system, wherein the information indicates resource usage by the managed entity;

applying the prospective policy to the information regarding the at least one managed entity;

determining if applying the prospective policy to the information regarding the at least one managed entity produces the specified result;

outputting the prospective policy in response to determining that the applying the prospective policy produces the specified result;

in response to determining that the applying the prospective policy does not achieve produce the specified result, performing:

varying, within a first range, a first parameter in the list of parameters to create a first modified prospective policy;

applying the first modified prospective policy to the information regarding the at least one managed entity; and determining if applying the first modified prospective policy to the information regarding the at least one managed entity produces the specified result, and if so, outputting the first modified prospective policy.

17. The computing system of claim 16, wherein the list of parameters includes information prioritizing the parameters in a particular order, wherein the list of parameters includes information indicating a range for each parameter, wherein the parameter in the list varied in the first range has a first priority, wherein the operations further comprise:

varying, within a second range, a second parameter in the list of parameters having a second priority to create a second modified prospective policy;

applying the second modified prospective policy to the information regarding the at least one managed entity;

determining if applying the second modified prospective policy to the information regarding the at least one managed entity produces the specified result;

and if so, outputting the second modified prospective policy.

18. The computing system of claim 17, wherein the operations further comprise:

varying, within a third range, a parameter in the list of parameters having a third priority to create a third modified prospective policy;

applying the third modified prospective policy to the information regarding the at least one managed entity;

determining if applying the third modified prospective policy to the information regarding the at least one managed entity produces the specified result;

and if so, outputting the third modified prospective policy.

19. The computing system of claim 18, wherein, if it is determined that the results of applying the first modified prospective policy and the second modified prospective policy and the third prospective policy to the information regarding the at least one managed entity do not produce the specified result, then the operations further comprise:

varying, within a fourth range, a parameter in the list of parameters having a fourth priority to create a fourth modified prospective policy;

applying the fourth modified prospective policy to the information regarding the at least one managed entity;

determining if applying the fourth modified prospective policy to the information regarding the at least one managed entity produces the specified result;

and if so, outputting the fourth modified prospective policy.

* * * * *